Patented May 9, 1950

2,507,055

UNITED STATES PATENT OFFICE 2,507,055

ADDITION AGENTS FOR MINERAL OILS AND COMPOSITIONS CONTAINING THE SAME

Herschel G. Smith, Wallingford, and Troy L. Cantrell, Lansdowne, Pa., and John G. Peters, Audubon, N. J., assignors to Gulf Oil Corporation, Pittsburgh, Pa., a corporation of Pennsylvania No Drawing. Application October 15, 1947,
Serial No. 780,110

19 Claims. (Cl. 252—32.5)

This invention relates to addition agents for mineral oils and compositions containing the same, and, more particularly, to improved mineral oil compositions which comprise a major amount of a mineral oil and a minor amount of new improvement agents which confer thereupon several useful and advantageous properties, such as the prevention of rust, corrosion and wear.

It is recognized in the art that the simple, straight mineral oils usually are deficient in one or more respects for certain commercial uses, and it is common practice to incorporate one or more "additive" compounds in the oil to overcome the defect or defects thereof. Likewise, various agents have been incorporated in oils to improve certain of their properties for particular or special uses requiring a superior oil. In general, such agents or additive compounds are known as "improvement" agents or "addition" agents.

It is an object of this invention to provide an improvement agent which, when incorporated in mineral oils and mineral oil compositions, will impart thereto rust-inhibiting qualities.

It is a further object of this invention to provide mineral oil compositions having improved rust and corrosion-inhibiting properties.

These and other objects are accomplished by the present invention wherein there is provided as an addition agent for mineral oils a compound having the general formula:

$$R_m\text{—}M\text{—}R'_n$$

wherein R represents an amidophthalyl radical containing an N-hydrocarbon substituent selected from the group consisting of alkyl and alkenyl substituents having from 8 to 18 carbon atoms, R' represents the 2-ethyl-hexyl, 3-methyl-butyl orthophosphoryl radical, M is a polyvalent metal, $m$ and $n$ are positive integers and at least one, and the sum of $m$ and $n$ is equal to the valence of M.

By an amidophthalyl radical containing an N-hydrocarbon substituent selected from the group consisting of alkyl and alkenyl substituents having from 8 to 18 carbon atoms, there is meant a radical having the formula:

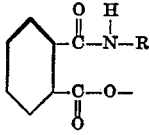

wherein R is an alkyl or alkenyl substituent having from 8 to 18 carbon atoms. By the 2-ethyl-hexyl, 3-methyl-butyl orthophosphoryl radical, there is meant a radical having the formula:

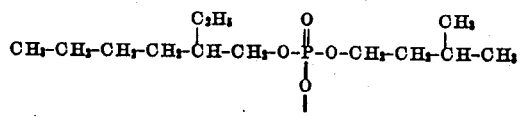

In our new compounds, the amidophthalyl radical and the orthophosphoryl radical are linked together through the polyvalent metal, the latter being attached to the unsatisfied valence of the oxygen atom in each radical. Thus, it will be seen that the compounds of our invention are mixed metal salts of an amidophthalic acid and an alkyl phosphoric acid.

Our new improvement agents may readily be prepared from a polyvalent metal oxide or hydroxide, phthalic anhydride, 2-ethyl-hexyl, 3-methyl-butyl orthophosphoric acid and primary aliphatic amines. These compounds are reacted in the proportions necessary to produce compounds having the formula $R_m$—M—$R'_n$ as set forth hereinabove. When M is a bivalent metal, molar proportions of the polyvalent metal oxide or hydroxide, the phthalic anhydride, the 2-ethyl-hexyl, 3-methyl-butyl orthophosphoric acid and the primary aliphatic amines are employed. When M is trivalent or higher, at least one mol of the 3-methyl-butyl, 2-ethyl-hexyl orthophosphoric acid or of the amidophthalic acid formed from the primary aliphatic amine and the phthalic anhydride are employed, the total molar proportions of both acids being sufficient to satisfy the valence of the metal. Thus, when M is trivalent, either 2 mols of the phosphoric acid and 1 mol of the amidophthalic acid are employed, or 1 mol of the phosphoric acid and 2 mols of the amidophthalic acid are employed. When M is tetravalent, 1, 2 or 3 mols of the amidophthalic acid may be used with 3, 2 or 1 mol of the phosphoric acid. The number of mols of the phthalic anhydride and primary amine are identical, since these react in equimolar proportions to form the amidophthalic acid.

In preparing our new componds, the polyvalent metal oxide or hydroxide, the phthalic anhydride and the primary aliphatic amine are first mixed together in proportions necessary to form a basic metal salt of the amidophthalic acid and then reacted. The reaction is exothermic and proceeds without heating or with slight heating. The reaction is completed by heating to a moderately elevated temperature, say 260° F. There is thus formed the basic metal salt of the amidophthalic acid. At that time, the 3-methyl-butyl, 2-ethyl-hexyl orthophosphoric acid is added to neutralize the residual basicity and to form the mixed salt of our invention.

Where our new compounds are to be used in mineral oils, such as motor oils, turbine oils, Diesel fuel oils, light naphthas and the like, it is highly advantageous to prepare the compounds in situ in the oil in which it is to be used. In this manner, concentrated solutions of the compounds may be prepared which may then be diluted down with the same or another mineral oil to the concentration desired in the final product.

The primary aliphatic amines used in preparing our new compounds have from 8 to 18 carbon atoms. Suitable amines include the primary alkyl amines, such as capryl amine, decylamine, undecylamine, dodecylamine (lauryl amine), tetradecylamine (myristyl amine), hexadecyl amine (cetyl amine), and octadecyl amine (stearyl amine); and the primary alkenyl amines, such as octenyl amine, decenyl amine, undecenyl amine, dodecenyl amine, tetradecenyl amine, hexadecenyl amine, and 9-10, octadecenyl amine. Mixtures of the amines may also be employed, particularly the commercially available mixture of amines known as cocoamine, prepared by converting the mixed fatty acids of coconut oil into the corresponding amines by well known methods. Cocoamine contains a major amount of lauryl amine mixed with minor amounts of homologues thereof. The commercial cocoamine has an average molecular weight of about 200–210, and may be employed with advantage in preparing our new improvement agents. The term "coco" is used herein and in the appended claims to define the mixtures of aliphatic radicals, i. e., the aliphatic residue, of the mixed aliphatic amines in cocoamine.

The polyvalent metal oxides and/or hydroxides used in preparing our new compounds include those of calcium, barium, magnesium, strontium, lead, tin, zinc, mercury, copper, cobalt, nickel, aluminum, bismuth, iron, cadmium, chromium, etc. Particularly good results are obtained from calcium hydroxide.

As a class the compounds of our invention are usually solids at ordinary room temperatures, but soften and melt at elevated temperatures below their decomposition point. They are viscous liquids at elevated temperatures below their boiling points. They can be readily fluxed and blended with mineral oils, and, in fact are soluble in a wide variety of mineral oils, including mineral lubricating oils and light naphthas. On the other hand, the compounds of our invention are water-resistant and practically insoluble in water and aqueous solutions.

The following examples are further illustrative of our invention.

*Example I.*—Seventy-four parts by weight of hydrated lime and 148 parts by weight of phthalic anhydride were added to 210 parts by weight of cocoamine, a mixed primary alkyl amine having a molecular weight of about 210. The reaction was exothermic. After the initial reaction began to subside, the mixture was heated to 260° F. and held at that point until the reaction was completed. The product was then cooled to 220° F. and 280 parts by weight of 3-methyl-butyl, 2-ethyl-hexyl orthophosphoric acid was slowly added with stirring. While still hot, the reaction product was filtered through an adsorbent clay to remove any suspended matter. The product obtained had the following formula:

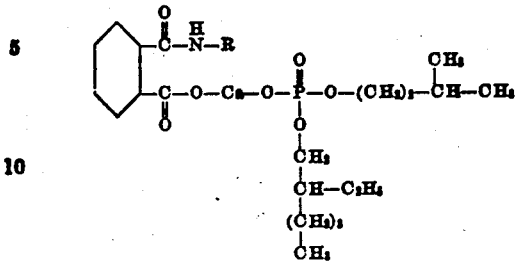

where R represents the "coco" radical.

*Example II.*—Example I was repeated except that the lime and phthalic anhydride were first dispersed in 1424 parts by weight of a 150 viscosity Texas lubricating oil. There was obtained a concentrate of the reaction product dissolved in the lubricating oil. The concentrate had the following properties:

| | |
|---|---|
| Gravity, °API | 19.7 |
| Viscosity, SUV: | |
| 100° F | 605 |
| 210° F | 50.9 |
| Phosphorus, per cent | 1.52 |
| Ash (as $SO_4$), per cent | 5.693 |

The above improvement agent concentrate had a good color, and was substantially free of insoluble matter. It was readily miscible with various mineral oils and oil compositions, and was directly soluble in most mineral oils in amounts effective for the present purposes. In particular, this improvement agent concentrate is useful and advantageous as an additive compound in preparing improved motor oils and like lubricants. It is also advantageous in preparing other improved compositions, useful in protecting metals against abrasion and corrosion.

The foregoing examples are typical and illustrative of certain embodiments of this invention. In other embodiments thereof, other primary alkyl or alkenyl amines can also be employed in making our improvement agents. Also other polyvalent metal oxides or hydroxides may be employed.

Improved motor oils, containing minor amounts of our improvement agents, have a plurality of advantageous properties. They are superior lubricants for internal combustion engines, particularly aviation, automotive and Diesel engines, even though the operating conditions are severe.

In addition to improved mineral lubricating oils, other valuable mineral oil compositions can be prepared from our new improvement agents. Thus, our new compounds may be added in minor amounts to Diesel fuel oils, and in addition to conferring corrosion-inhibiting properties, the resulting Diesel fuel composition results in reduced ring-sticking, gum formation and wear in Diesel engines burning said composition. Furthermore, mineral oil compositions containing our new compounds are excellent coating compositions for metals and effectively protect both ferrous and non-ferrous metals from corrosion, even when in contact with aqueous liquids or subject to other drastic service conditions. Accordingly, a wide range of protective coating compositions for metals can be prepared by the present invention. For instance, our new improvement agents may be dissolved in volatile mineral oils, such as light naphthas including kerosene and Stoddard solvent, to obtain protective coating compositions for metals which can be applied by brushing, dipping or spraying. After evaporation of the light naphtha, the metal becomes coated with a tightly adherent protective film which is substantially impervious to water and aqueous solutions. Furthermore, our improvement agents may be dissolved in substantially non-volatile mineral oils to obtain still other excellent protective coating compositions for metals, such as slushing oils.

In general, in preparing our improved mineral oil compositions, our new improvement agents are dissolved in the selected mineral oil base in an amount sufficient to confer corrosion inhibiting properties on the composition. Generally, such mineral oil compositions will contain from 0.01 to 10.0 per cent by weight of our new improvement agents.

*Example III.*—As an example of an improved mineral oil lubricant composition in accordance with our invention, a turbine oil was improved by the addition of 0.3 per cent by weight of the agent prepared in accordance with Example I. This improved turbine oil effectively protected steel strips when subjected to drastic corrosion tests. A comparison of the base oil and the improved turbine oil follows:

| Composition | Turbine Oil Base | Improved Turbine Oil |
|---|---|---|
| *Properties* | | |
| Gravity, °API | 32.8 | 32.7 |
| Viscosity, SUV, 100° F | 153.1 | 153.0 |
| Viscosity, SUV, 210° F | 44.0 | 44.0 |
| Flash, OC, °F | 410 | 415 |
| Fire, OC, °F | 460 | 465 |
| Pour, °F | +5 | +5 |
| Color, NPA | 1.25 | 1.25 |
| Neutralization No | 0.01 | 0.01 |
| Corrosion tests: | | |
| ASTM D665–42T— | | |
| Synthetic Sea Water 10%: | | |
| Steel Strip, Appearance | rust | bright |
| Area rusted, per cent | 100 | 0 |
| Method 412, Gulf— | | |
| 4 cc. synthetic sea water, 36 cc. oil, 12 days' exposure: | | |
| Steel strip, Appearance | rust | bright |
| Area rusted, per cent | 100 | 0 |
| Falex Wear Test: | | |
| 500 Lb. Gauge Load, 15 min.— | | |
| Wear, No. of teeth | 3 | 0 |
| Gauge Load at Seizure, Lb | 700 | 900 |

In the corrosion test using method 412, Gulf, the procedure is as follows: 36 cc. of the oil to be tested and 4 cc. of synthetic sea water are placed in a 1" by 6" Pyrex test tube. A polished steel strip is inserted in the oil-water mixture, and 2000 cc. of humid air per hour are bubbled through the mixture from a point near the bottom of the tube, so as to provide exposure to more severe oxidizing conditions by aeration, and to continuously mix the oil and water. The test is conducted with the apparatus sitting in a water bath maintained at 122° F. (50° C.) and the original water level in the tube maintained by the addition of synthetic sea water every 24 hours. This test is continued for 12 days, after which the test strip is removed and inspected.

As shown by the preceding test data, our improved turbine oil had outstanding rust-preventive properties. In the corrosion test using the improved oil, the steel strip was bright and showed no evidence of corrosion at the end of 12 days' contact with the synthetic sea water, whereas the straight oil failed to pass this test, the steel test strip showed heavy rusting after several hours' exposure.

As shown by the data on the Falex Wear Test, the anti-wear properties of the oil were also improved.

The marked improvement in rust and corrosion resistance which is imparted to mineral lubricating oils is without harmful effect on the lubricating properties of the oils. In fact, the lubricating properties of the oil are enhanced. The increased detergency of the oil facilitates lubrication under the extreme conditions found in internal combustion engines. The marked improvement in corrosion resistance is accompanied also by a maintained stability against oxidation.

As has been stated, our new compounds may be added in minor amounts to Diesel fuel oils to retard corrosion, wear, ring-sticking and gum formation in a Diesel engine burning said composition. The following are examples of improved Diesel fuel oils in accordance with our invention.

*Example IV.*—The following table gives the comparative properties of a Diesel fuel oil and an improved light Diesel fuel oil of the present invention, prepared by blending 0.3% by volume of the concentrate described in Example II with 99.7% by volume of a light Diesel fuel oil.

| Composition | Light Diesel Fuel Oil | |
|---|---|---|
| | Base | Improved |
| Gravity, °API | 43.0 | 42.9 |
| Viscosity, SUV, 100° F | 35.2 | 35.4 |
| Flash, P-M, °F | 164 | 164 |
| Pour, °F | −5 | −5 |
| Color, Saybolt | +20 | +19 |
| Sulfur, L, percent | 0.06 | 0.06 |
| Water and Sediment, percent | nil | nil |
| Carbon Residue, percent | 0.01 | 0.02 |
| Precipitation No | nil | nil |
| Copper Strip Test, 212° F., 3 Hr | passes | passes |
| Neutralization No | 0.01 | 0.03 |
| Cetane No.: CFR Ignition Delay Method | 62 | 62 |
| Diesel Index No | 74 | 74 |
| Ash, percent | nil | 0.01 |
| Distillation, Gas Oil: | | |
| ASTM D158–41— | | |
| Over Point, °F | 380 | 380 |
| End Point, °F | 636 | 630 |
| 10% at: °F | 440 | 442 |
| 50% at: °F | 496 | 495 |
| 90% at: °F | 549 | 545 |
| Corrosion Test: | | |
| ASTM D665–46T— | | |
| Steel Rod, Appearance | rust | bright |
| Area Rusted, percent | 100 | 0 |

*Example V.*—The following table gives the comparative properties of a heavy Diesel fuel oil and an improved heavy Diesel fuel oil of the present invention, prepared by blending 0.5% by volume of the concentrate described in Example II, with 99.5% by volume of a heavy Diesel fuel oil.

| Composition | Heavy Diesel Fuel Oil | |
|---|---|---|
| | Base | Improved |
| Gravity, °API | 24.4 | 24.3 |
| Viscosity, SUV: | | |
| 100° F | 163 | 161 |
| 210° F | 44 | 44 |
| Flash, P-M, °F | 250 | 250 |
| Flash, OC, °F | 280 | 280 |
| Fire, OC, °F | 320 | 320 |
| Pour, °F | +40 | +40 |
| Sulfur, L, Per Cent | 0.4 | 0.4 |
| Water and Sediment, Per Cent | 0.1 | 0.1 |
| Sediment: ASTM D473–38T | 0.01 | 0.02 |
| Carbon Residue, Per Cent | 1.5 | 1.7 |
| Precipitation No | trace | trace |
| Ash, Per Cent | 0.1 | 0.12 |
| BTU/Lb. (gross) | 19,188 | 19,188 |
| Corrosion Test: | | |
| ASTM D665–46T— | | |
| Steel Rod, Appearance | rust | bright |
| Area Rusted, Per Cent | 100 | 0 |

What we claim is:

1. The process of preparing a substantially neutral, oil-soluble, mixed polyvalent metal salt of an amidophthalic acid and 2-ethyl-hexyl, 3-methyl-butyl orthophosphoric acid which comprises reacting phthalic anhydride, a primary aliphatic amine selected from the group consisting of primary alkyl and alkenyl amines having from 8 to 18 carbon atoms and a compound selected from the group consisting of polyvalent metal oxides and hydroxides to form a basic polyvalent metal salt of an amidophthalic acid having an N-hydrocarbon substituent selected from the group consisting of alkyl and alkenyl substituents of from 8 to 18 carbon atoms, and neutralizing the resulting basic salt with 2-ethyl-hexyl, 3-methyl-butyl orthophosphoric acid.

2. The process of preparing a substantially neutral, oil-soluble mixed polyvalent metal salt of an amidophthalic acid and 2-ethyl-hexyl, 3-methyl-butyl orthophosphoric acid which comprises dispersing phthalic anhydride, a primary aliphatic amine selected from the group consisting of primary alkyl and alkenyl amines having from 8 to 18 carbon atoms and a compound selected from the group consisting of polyvalent metal oxides and hydroxides in a mineral oil, reacting the ingredients of said dispersion to form in said oil a basic polyvalent metal salt of an amidophthalic acid having an N-hydrocarbon substituent selected from the group consisting of alkyl and alkenyl substituents of from 8 to 18 carbon atoms, neutralizing the resulting basic salt with 2-ethyl-hexyl, 3-methyl-butyl orthophosphoric acid, and recovering a solution of the neutralized salt in said mineral oil.

3. The process of claim 2, wherein the mineral oil is a mineral lubricating oil.

4. The process of claim 2, wherein the mineral oil is a light naphtha.

5. The process of preparing a substantially neutral, oil-soluble, mixed calcium salt of an N-alkyl amidophthalic acid and 2-ethyl-hexyl, 3-methyl-butyl orthophosphoric acid which comprises reacting phthalic anhydride, a primary alkyl amine having from 8 to 18 carbon atoms and calcium hydroxide to form a basic calcium salt of an amidphthalic acid having an N-alkyl substituent of from 8 to 18 carbon atoms, and neutralizing the basic calcium salt with 2-ethyl-hexyl, 3-methyl-butyl orthophosphoric acid.

6. The process of claim 5, wherein the primary alkyl amine is cocoamine.

7. The process of claim 5, wherein the phthalic anhydride, primary amine and calcium hydroxide are dispersed in a mineral oil prior to being reacted and there is recovered a solution of the substantially neutral mixed calcium salt of the amidophthalic acid and the 2-ethyl-hexyl, 3-methyl-butyl orthophosphoric acid in said mineral oil.

8. A new compound having the formula:

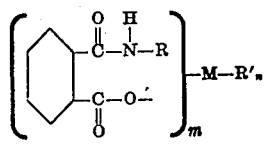

wherein R represents a hydrocarbon substituent selected from the group consisting of alkyl and alkenyl substituents having from 8 to 12 carbon atoms, R' represents the 2-ethyl-hexyl, 3-methyl-butyl orthophosphoryl radical, M is a polyvalent metal, $m$ and $n$ are positive integers and at least one, and the sum of $m$ and $n$ is equal to the valence of M.

9. A compound in accordance with claim 8, wherein R is an alkyl substituent having from 8 to 18 carbon atoms.

10. A compound in accordance with claim 8, wherein R is an alkenyl substituent having from 8 to 18 carbon atoms.

11. A compound in accordance with claim 8, wherein M is calcium.

12. A substantially neutral, oil-soluble, mixed calcium salt of an N-alkyl amidophthalic acid having the formula

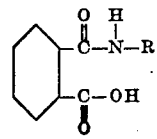

and 2-ethyl-hexyl, 3-methyl-butyl orthophosphoric acid, wherein R is an alkyl substituent having from 8 to 18 carbon atoms.

13. A salt in accordance with claim 12, wherein R is the "coco" substituent.

14. A composition of matter comprising a mineral oil and a corrosion-inhibiting amount of a compound having the formula:

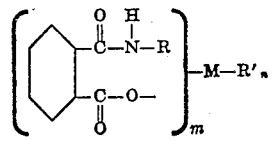

wherein R represents a hydrocarbon substituent selected from the group consisting of alkyl and alkenyl substituents having from 8 to 18 carbon atoms, R' represents the 2-ethyl-hexyl, 3-methyl-butyl orthophosphoryl radical, M is a polyvalent metal, $m$ and $n$ are positive integers and at least one, and the sum of $m$ and $n$ is equal to valence of M.

15. A composition in accordance with claim 14 wherein said compound is present in an amount of from 0.01 to 10.0 per cent by weight of the composition.

16. A composition in accordance with claim 14 wherein the mineral oil is a Diesel fuel oil.

17. A lubricant composition comprising a major amount of a mineral lubricating oil and a minor amount, sufficient to confer corrosion-inhibiting properties on the composition, of a compound having the formula:

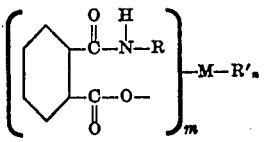

wherein R represents a hydrocarbon substituent selected from the group consisting of alkyl and alkenyl substituents having from 8 to 18 carbon atoms, R' represents the 2-ethyl-hexyl, 3-methyl-butyl orthophosphoryl radical, M is a polyvalent metal, $m$ and $n$ are positive integers and at least one, and the sum of $m$ and $n$ is equal to the valence of M.

18. A lubricant composition comprising a major amount of a mineral lubricating oil and a minor amount, sufficient to confer corrosion-inhibiting properties on the composition, of a substantially neutral, oil-soluble, mixed calcium salt of an N-alkyl amidophthalic acid having the formula

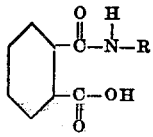

and 2-ethyl-hexyl, 3-methyl-butyl orthophosphoric acid, wherein R is an alkyl substituent having from 8 to 18 carbon atoms.

19. A composition in accordance with claim 18, wherein R is the "coco" substituent.

HERSCHEL G. SMITH.
        TROY L. CANTRELL.
        JOHN G. PETERS.

REFERENCES CITED

The following references are of record in the file of this patent:

UNITED STATES PATENTS

| Number | Name | Date |
|---|---|---|
| 2,080,299 | Benning et al. | May 11, 1937 |
| 2,224,695 | Prutton | Dec. 10, 1940 |
| 2,322,307 | Neily et al. | June 22, 1943 |
| 2,345,156 | Roberts | Mar. 28, 1944 |
| 2,371,851 | Smith et al. | Mar. 20, 1945 |
| 2,378,442 | Smith et al. | June 19, 1945 |
| 2,400,611 | Smith et al. | May 21, 1946 |
| 2,409,774 | Mack et al. | Oct. 22, 1946 |

Certificate of Correction

Patent No. 2,507,055 May 9, 1950

HERSCHEL G. SMITH ET AL.

It is hereby certified that error appears in the printed specification of the above numbered patent requiring correction as follows:

Column 7, line 72, for "8 to 12 carbon" read *8 to 18 carbon*;

and that the said Letters Patent should be read with this correction therein that the same may conform to the record of the case in the Patent Office.

Signed and sealed this 25th day of July, A. D. 1950.

[SEAL]

THOMAS F. MURPHY,
*Assistant Commissioner of Patents.*